United States Patent [19]

Colwell et al.

[11] 4,251,359
[45] Feb. 17, 1981

[54] ON-SITE WASTEWATER TREATMENT SYSTEM

[75] Inventors: Gary R. Colwell; Luther Freeman, both of Eugene, Oreg.

[73] Assignee: C₂F Investment Company, Veneta, Oreg.

[21] Appl. No.: 40,715

[22] Filed: May 21, 1979

[51] Int. Cl.³ .............................................. C02F 3/30
[52] U.S. Cl. ................................. 210/605; 210/617; 210/622; 210/139; 210/151; 210/195.1; 210/630
[58] Field of Search .................... 210/7, 16, 17, 150, 210/151, 170, 195.1, 220, 532 S, 138–140, DIG. 28, 3

[56] References Cited

U.S. PATENT DOCUMENTS

| | | | |
|---|---|---|---|
| 2,142,196 | 1/1939 | Langdon | 210/17 |
| 2,220,859 | 11/1940 | Bispham et al. | 210/16 |
| 2,283,166 | 5/1942 | Buell | 210/17 |
| 2,694,043 | 11/1954 | Jenks | 210/151 |
| 3,143,498 | 8/1964 | Fordyce | 210/151 |
| 3,238,124 | 3/1966 | Burton | 210/150 |
| 3,617,540 | 11/1971 | Bishop | 210/DIG. 28 |
| 3,623,976 | 11/1971 | Cessna | 210/7 |
| 3,681,236 | 8/1972 | Bergles | 210/16 |
| 3,956,128 | 5/1976 | Turner | 210/150 |
| 4,086,167 | 4/1978 | Tapola | 210/150 |

FOREIGN PATENT DOCUMENTS

| | | | |
|---|---|---|---|
| 150870 | 5/1950 | Australia | 210/151 |
| 1041231 | 10/1978 | Canada | 210/150 |
| 2731887 | 1/1978 | Fed. Rep. of Germany | 210/170 |

*Primary Examiner*—Ernest G. Therkorn
*Attorney, Agent, or Firm*—Seed, Berry, Vernon & Baynham

[57] ABSTRACT

An on-site wastewater treatment system is disclosed suitable for domestic or other sewage. After separation of the settleable solids from incoming wastewater by means of a septic tank or other means the effluent is passed into a basin holding particles of a media through which the effluent travels. The media bed removes a substantial amount of the suspended solids in the effluent and some of the BOD (biological oxygen demand material). The filtrate is collected and uniformly dispersed, preferably by spraying, over the surface of the same media bed for travel therethrough a second time. The effluent carries oxygen from the air into the media. The media retains the effluent until the surface tension of the effluent between the particles of the media bed is overcome by gravity, at which time it is displaced from the media and discharged. During the retention time aerobic action in the media bed reduces the bacterial count of the effluent significantly. The effluent from the septic tank is preferably alternately distributed between a first area of the media bed and a separate second area of the media bed in order to allow continuous regeneration of the media bed by avoiding a continuously ponded condition and by the action of the aerated effluent.

21 Claims, 13 Drawing Figures

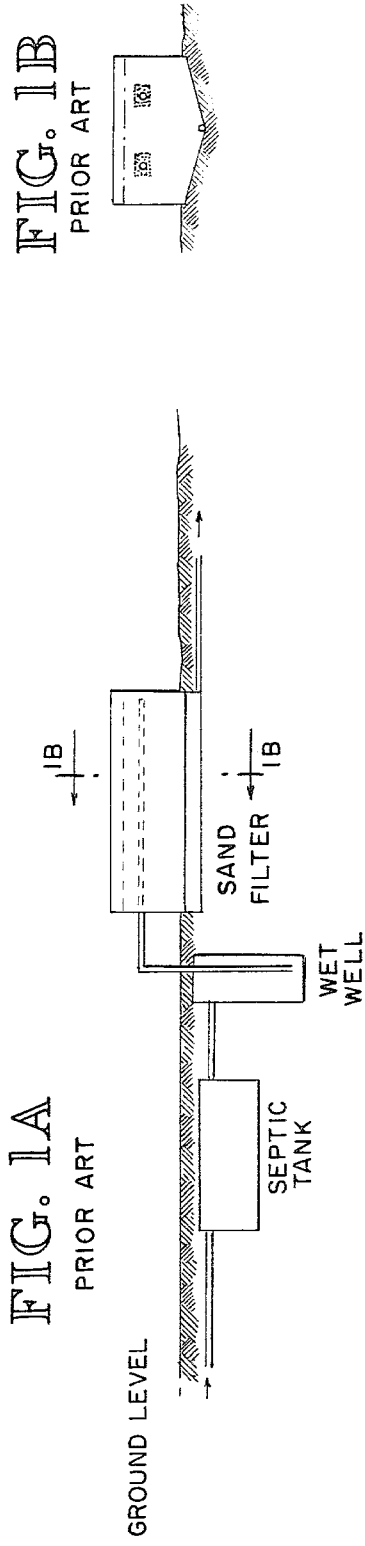
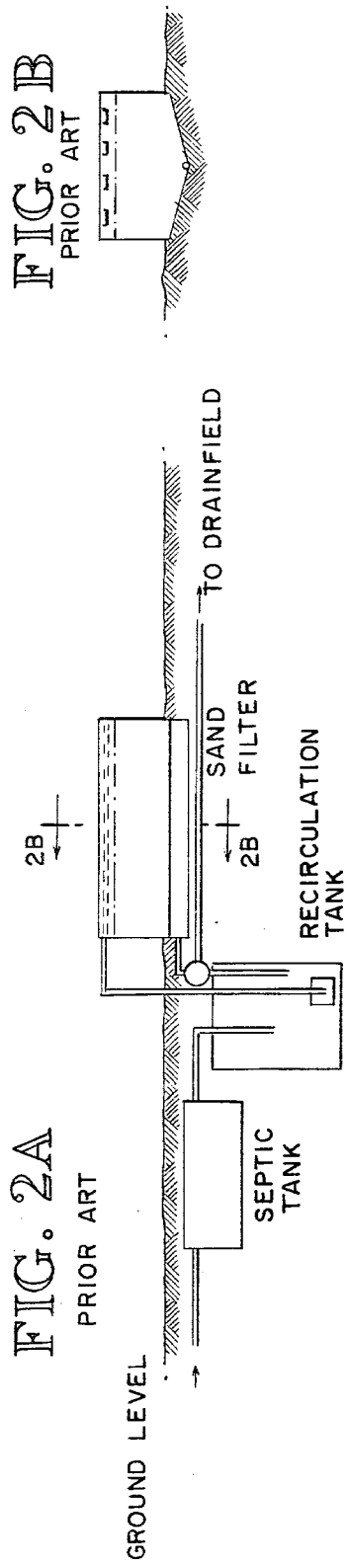
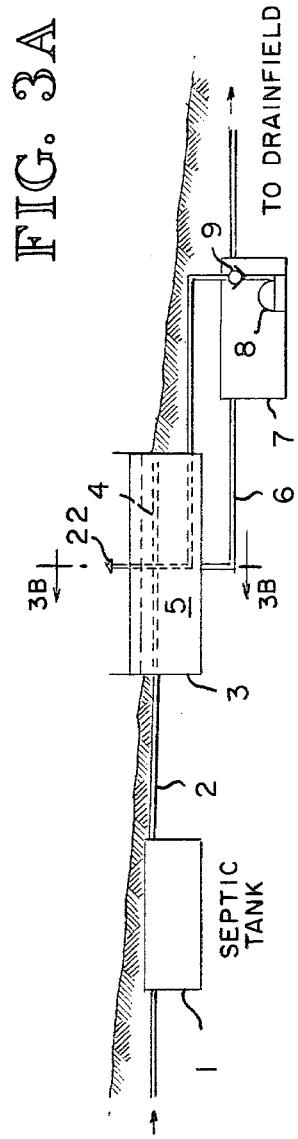

ON-SITE WASTEWATER TREATMENT SYSTEM

BACKGROUND OF THE INVENTION

1. Field of the Invention

This invention relates to an on-site wastewater treatment system and on-site method of treating wastewater.

2. Prior Art Relevant to the Disclosure

On-site disposal of wastewater (sewage) from single family residences and commercial establishments in areas with no conventional sewer system has conventionally been accomplished by a septic tank system where the anaerobic effluent discharged from the septic tank, after settling of the solids portion of the incoming wastewater, is passed into a subsurface drainfield for percolation into the surrounding soil. Such a system works satisfactorily if properly installed and if proper soil conditions for disposal of the effluent by the drainfield exist. In many areas, soil conditions are unsuitable for treatment of the effluent from septic tanks. In such areas one alternative is to utilize small treatment plants which make use of chemical and/or biological treatment means, such as primary, secondary and sometimes tertiary treatment to render the effluent suitable for disposal. Such treatment plants are prohibitively expensive, both to construct and operate unless there is a sufficiently dense population base or industrial base for financially supporting the treatment plant. Such treatment plants are generally not economically feasible for treatment of domestic sewage in rural and semi-rural areas. Other alternative methods of on-site waste treatment and disposal are known; however, many of them have never been accepted by local health authorities because of insufficient treatment of the wastewater.

Two alternative systems are illustrated by FIGS. 1 and 2 of the drawings. FIG. 1 illustrates a system known as the intermittent sand filter system. In the intermittent sand filter system anaerobic effluent from a septic tank is pumped into subsurface drains positioned in a sand filter. The effluent is generally pumped into one of the subsurface drains in one area of the filter bed for a period of time and then switched to pump it into the other subsurface drain or drains of the filter bed for a further period of time to allow regeneration of the bed around the first drain. In the intermittent sand filter, anaerobic slime builds up directly beneath the perforated drain pipes through which the effluent enters. The action of the intermittent sand filter is primarily mechanical and the bacterial count of effluent leaving the sand filter is not reduced substantially. The only oxygen which reaches the effluent in the sand filter for aerobic degradation of the fecal bacteria is that which filters down through the top layer of sand. A major disadvantage of the intermittent sand filter is the physical size of the filter required to treat a particular amount of effluent. For example, to treat 450 gallons of effluent by such an intermittent sand filter would require a sand filter accommodating two 50 foot subsurface drains.

FIG. 2 illustrates another alternative system known as the Hines-Favreau system. In the Hines-Favreau system effluent is discharged from the septic tank into a recirculating tank from where it is pumped into perforated drain troughs positioned above the level of sand in the filter bed. The effluent trickles down through the sand filter with a portion of the effluent reentering the recirculation tank and a portion being discharged to a drain field. The portion entering the recirculation tank is again recirculated through the sand filter. With the Hines-Favreau system a high degree of mechanical filtration occurs through the sand filter. Clumps of algae, however, tend to build up directly beneath where the effluent trickles down onto the surface of the sand filter. Over a period of time this causes channelization through the filter bed to occur and inefficient and ineffective treatment results. As is true of the intermittent sand filter system, the bacterial count of effluent discharged from the sand filter of the Hines-Favreau system, although lower generally than that discharged from the intermittent sand filter system, is still too high to satisfy health authorities. After a period of time with the Hines-Favreau system, the sand filter becomes matted and clogged with filtered solids and a bacteriological mat and must be cleaned and/or the sand replaced. If not, the system fails to work effectively.

In neither of the two prior art systems described is there an effective retention/displacement cycle of the effluent within the sand filter as occurs in the system claimed. Because of the high ratio of retention time to displacement which occurs in the media bed of the system described and claimed in this application, bacterial action occurs which results in substantially lower bacteria counts in the discharged effluent.

SUMMARY OF THE INVENTION

For purposes of this application, the term "media" used herein means an artificially constructed environment conducive to the growth and maintenance of aerobic soil organisms for the biological treatment of wastewater.

It is a primary object of this invention to provide a dependable on-site wastewater treatment system wherein wastewater, after solids separation, is passed through particles of media in a bed, collected, and uniformly distributed a second time over the same media before discharge.

It is a further object of this invention to provide an on-site wastewater treatment system wherein effluent, after solids separation, is passed intermittently between a first area of particles of a media in a bed and a separate area of the same media in the same or a separate bed with the collected effluent then being uniformly dispersed over the media in the bed through which the effluent was initially passed.

It is a further object of this invention to provide an on-site wastewater treatment system wherein the effluent, after solids separation, is passed through a particulate media at least twice with periodic recirculation of the effluent before discharge from the media.

It is a further object of this invention to provide an on-site wastewater treatment system wherein effluent, after solids separation, is passed into a subsurface area of a bed of particulate media which retains the effluent therein for a period of time after which it is displaced from the media, collected and uniformly dispersed over the top surface of the media for retention by the media a second time before being displaced and discharged.

It is a further object of this invention to provide an on-site wastewater treatment system wherein the fecal bacterial count of the discharged effluent is reduced sufficiently to permit use of the effluent as process water for toilets or urinals, for landscape irrigation, or other purposes.

These and other objects are accomplished by a method and system for on-site treatment of wastewater by effecting solid-liquid separation of the gravity settleable solids portion of the wastewater, passing the effluent with the solids removed into a bed comprising particles of media which retain the effluent therein for a period of time before displacement by additional effluent, collecting the displaced effluent, and uniformly dispersing the displaced effluent over the media bed for retention and displacement a second time by the media. The effluent after retention and displacement a second time through the media, is collected and discharged. In order to allow continuous use of the media without incurring problems of matting and clogging, the wastewater, after solids separation, is intermittently passed into a first sub-surface area of the media bed for a period of time and then passed into a separate subsurface area of the media bed for a further period of time. The intermittent use of different portions of the media bed allows organic recovery of that portion of the media bed for subsequent use.

BRIEF DESCRIPTION OF THE FIGURES OF THE DRAWINGS

FIGS. 1A and 1B are schematics of an intermittent sand filter treatment system and vertical cross-section of the intermittent sand filter;

FIGS. 2A and 2B are schematics of a typical Hines-Favreau treatment system and vertical cross-section of the sand filter;

FIGS. 3A and 3B are schematics of the treatment system of this invention employing a media bed having a single drain opening and vertical cross-section of the media bed;

DESCRIPTION OF THE PREFERRED EMBODIMENTS

Figure 3B:
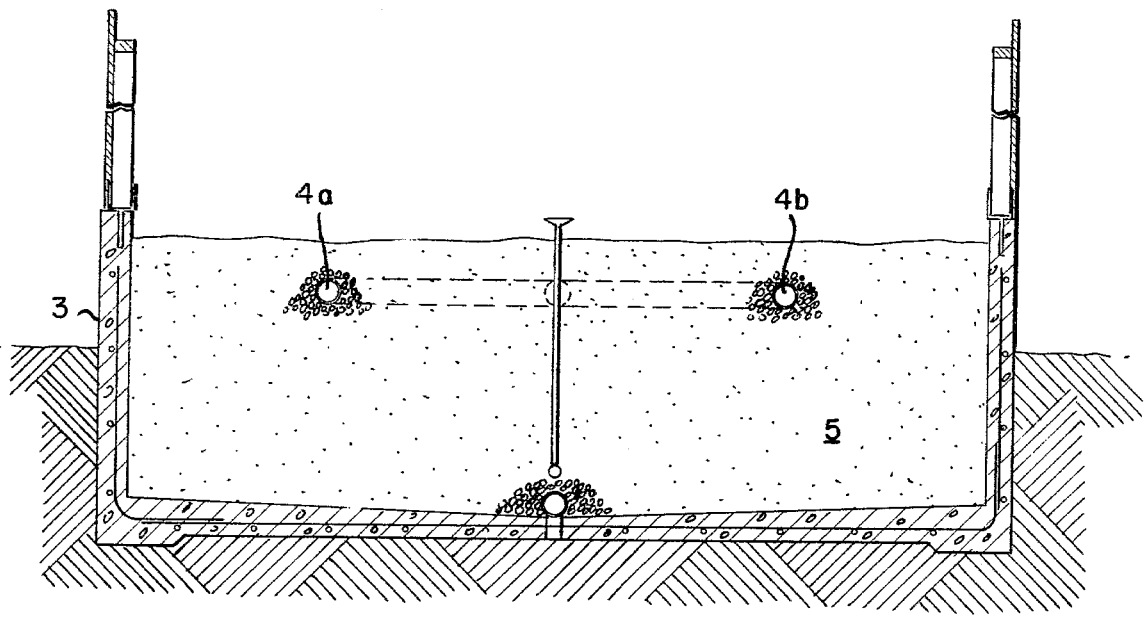

The on-site wastewater treatment system as herein described may be used for treatment of residential or commercial wastes which contain no significant amounts of heavy metals and/or synthetic organics of the type discharged from chemical treating and manufacturing facilities, electroplating industries or metal working industries. The typical effluent from residential and commercial business establishments consists primarily of human waste in admixture with biodegradable materials such as food etc.

The wastewater to be treated generally contains gravity settleable solids. While any means of effecting solid-liquid separation may be used, the most commonly used method is a septic tank into which the wastewater is discharged and the solids allowed to settle by gravity. The effluent leaving the septic tank is anaerobic, i.e. it is not exposed to air or aeration. The solids within the septic tank are subjected to partial anaerobic degradation. Although septic tank designs vary, the conventional septic tank is a vessel containing a bottom wall and side walls, generally of reinforced concrete, and a top wall having inspection opening near the inlet and outlet of the vessel and a central opening for inspection and pumping of the solids from the tank when necessary. The tank is also generally provided with baffles near the inlet and outlet to prevent flow of solids from the outlet with the effluent.

The system described in this application combines certain features of the intermittent sand filter system and the Hines-Favreau system in a way to create a more effective and efficient treatment system. As previously stated, the media making up the media bed is a material conducive to the growth and maintenance of aerobic soil type organisms for the biological treatment of wastewater. The media is preferably a material such as sand; however, other irregularly shaped particulate materials such as particulate garnet, crushed glass, etc may be used. The particle size of the particulate material making up the media should not be so large that channeling of effluent through the bed occurs readily nor so small that hydraulic compaction of the bed occurs and prevents adequate drainage. The irregular shaped particles of sand or other particulate media within the basin are separated by small interstices which hold effluent by surface tension. The media bed may be evenly saturated with effluent and the effluent retained within the interstices of the media bed for a substantial retention time before its field capacity is exceeded, i.e. the amount of water the media bed will hold until the surface tension between the particulate particles is overcome by the addition of additional amounts of effluent and gravity. The retention/displacement cycle which occurs in the system described in this application does not occur to the same degree in either the intermittent sand filter system of FIG. 1 or the Hines-Favreau system of FIG. 2. In the intermittent sand filter system the action is primarily mechanical. There is no even dispersion of effluent over the surface of the filter media. The same is true of the Hines-Favreau system wherein a high degree of mechanical filtration and channelization of the filter bed occurs without the retention/displacement cycle of the effluent. The sand material should preferably fall within the following ranges with a uniformity coefficient of about 2.5; however, other media material having different grain size distributions which accomplish the results desired herein may also be used.

|  | Percentages |
| --- | --- |
| Passing a ⅜" sieve | 100 |
| Passing a No. 4 sieve | 80–100 |
| Passing a No. 10 sieve | 35–80 |
| Passing a No. 30 sieve | 10–60 |
| Passing a No. 50 sieve | 0–30 |
| Passing a No. 100 sieve | 0–5 |

Referring to FIG. 3, wastewater flowing into a septic tank 1 is discharged into line 2 where it flows by gravity to the media basin 3 through two perforated subsurface drain lines 4 extending substantially the length of the basin 3. The basin has a sloped bottom wall and a single drain opening at the apex of the sloped floor of the basin. The perforated drain lines 4 are placed about 6 inches below the top surface of the media and are surrounded with a layer of round rock. In like manner, the drain opening is surrounded with a layer of round rock.

Effluent is displaced from the coarse sand media 5 in the basin through drain opening and drain line 6 into a recirculating tank 7 which includes a submersible pump 8 which pumps the displaced effluent through a valve and line 9 leading back into the basin 3 where it is evenly dispersed by sprinkling through a sprinkler head over the top surface of the media 5 in the media basin 3. The effluent distributed uniformly over the surface of the media is retained by the media before being displaced again through drain line 6 into recirculation tank 7. Effluent is discharged from the recirculation tank through a line leading to a drainfield or otherwise disposed of. The submersible pump 8 in the recirculation tank is preferably provided with a clock timer for intermittent operation and may also include high water and low water controls (not shown) for safety purposes.

Figure 4:
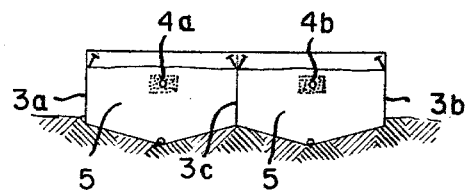
FIG. 4 is a vertical cross-section of a modified media bed.

FIG. 4 illustrates a modification of the media basin of FIGS. 3A and 3B wherein the media basin 3 is separated into two sections 3a and 3b by a central wall 3c. Each section of the media basin includes a drain opening which connects to the recirculation tank 7. With this modification, a valve is provided in the line 2 to direct effluent coming from the septic tank initially through one of the subsurface drain lines 4a or 4b, thereby allowing the other drain line to remain inactive for a period of time for rejuvenation of the media to occur. Likewise, the line leading from the recirculation tank may be bifurcated and valved to uniformly disperse the recirculated effluent through sprinkler heads over the surface of the media whose subsurface drain 4a or 4b is not being used at that time to receive effluent from the septic tank.

Referring again to FIG. 3B it is preferable to alternate use of discrete areas of the media by means of valving (not shown) for delivery of effluent through one of the drain lines 4a for a period of time, then closing off that line to flow of effluent and delivering effluent for another period of time only through the adjacent line 4b. By doing so, mat buildup and clogging of the media around the perforated drain lines 4a and 4b is prevented through degradation of the organic material by aerobic bacteria which receive oxygen as a result of the recirculated effluent distributed over the top surface of the media which carries dissolved oxygen and some free oxygen into the media.

FIGS. 5 through 10 illustrate a system similar to that previously described except that the media basin has multiple drain openings. The system illustrated in FIGS. 5-10 and the media basin thereof is designed so that effluent discharged into the media basin must travel through the media basin at least twice before discharge.

Figure 5:
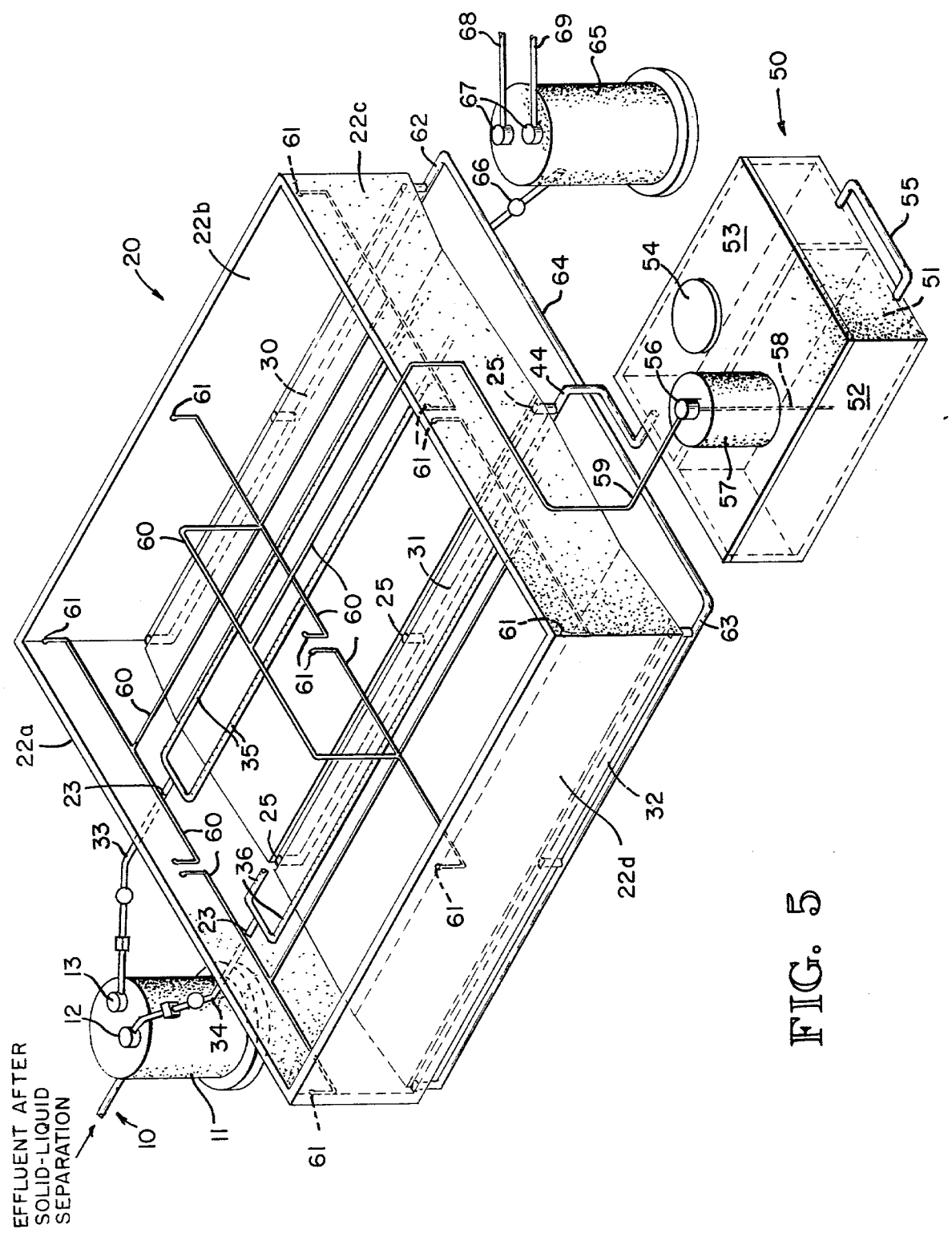
FIG. 5 is a perspective view of an on-site waste-water treatment system wherein the media basin includes multiple drain openings and wherein a portion of the effluent displaced from the bed is recirculated through the bed more than two times.

Referring to FIG. 5, effluent, after separation of the gravity settleable solids, is discharged through line 10 and flows into a wet well 11 where it is pumped by either pump 12 or 13 to a basin 20 as will be described. If it is possible to locate the basin at a lower elevation than the line 10, flow of the effluent to the basin may be by gravity, thus eliminating the need for the wet well 11 and the pumps. Timed valving may be used to distribute effluent between the subsurface lines 35 and 36.

Figure 6:
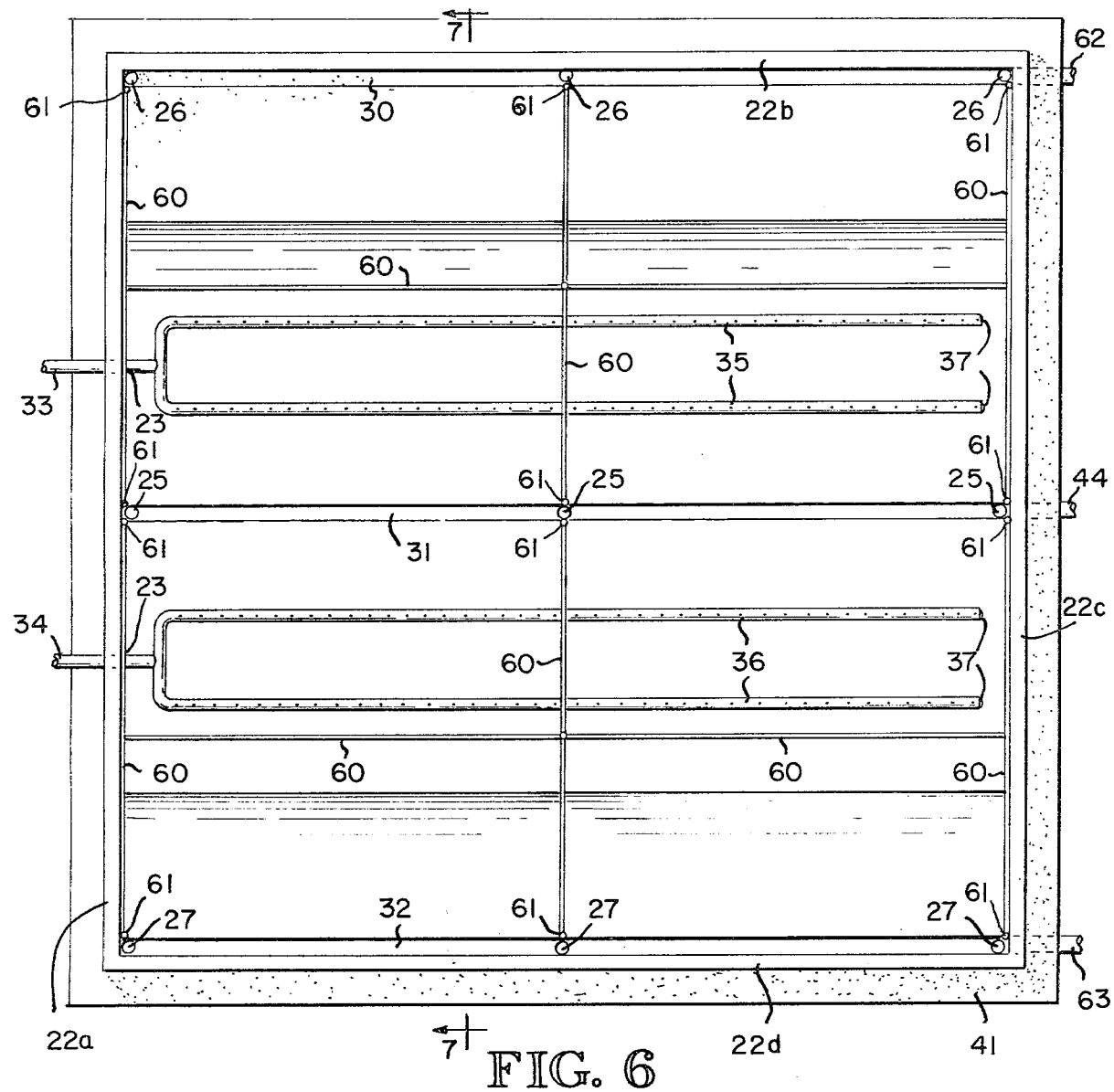
FIG. 6 is a top view of the media bed of FIG. 5.
Figure 7:
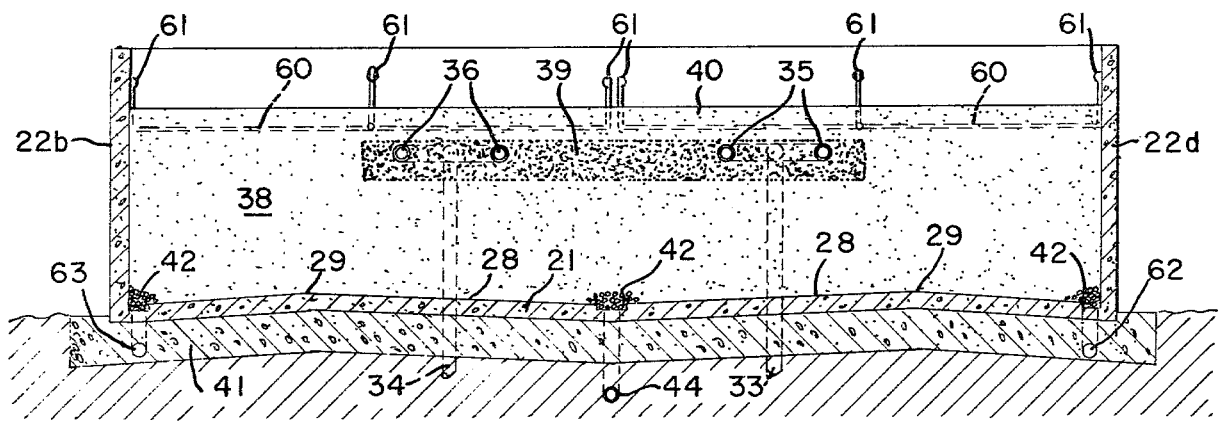
FIGS. 7 and 8 are vertical cross sections of the media basin of FIG. 2 illustrating positioning of the distribution lines and drain lines in the media.
Figure 8:
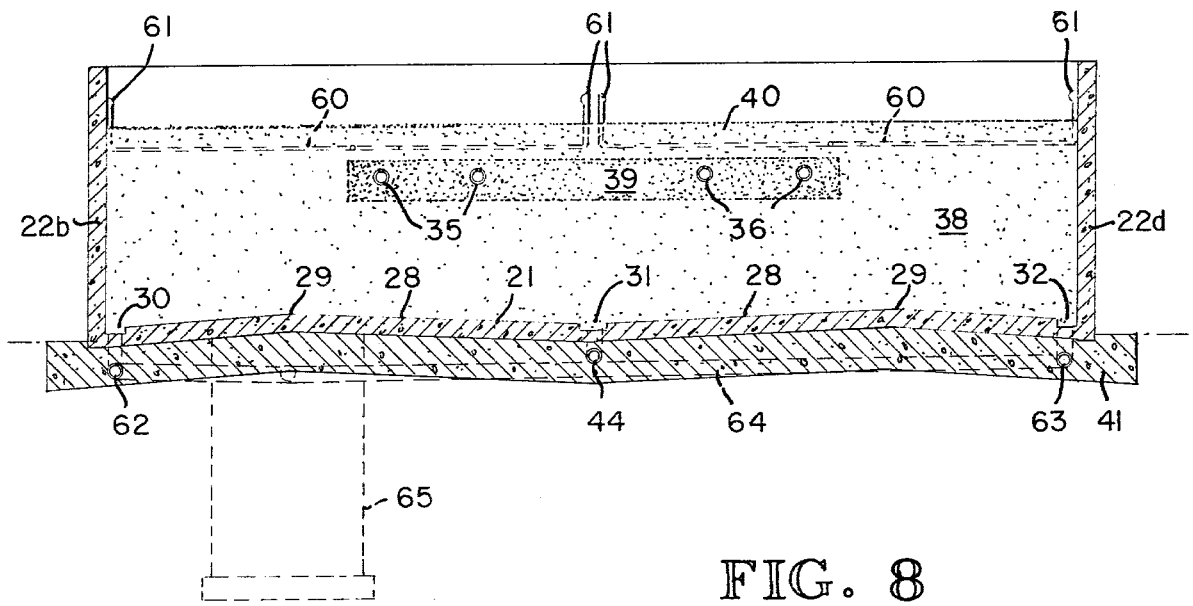
Figure 9:
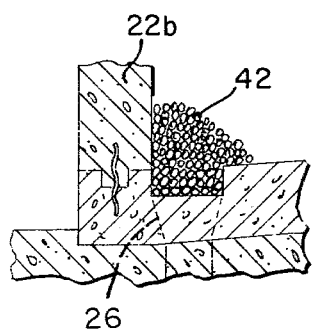
FIG. 9 is an expanded, partial view of one of the drain openings in the media basin.

The basin 20 is an open air basin, generally of reinforced concrete or other suitable material, having a bottom wall 21 and side walls 22a, b, c and d. Side wall 22a has openings 23 therein at an appropriate level for entry of the distribution lines for the effluent as will be described. The basin is sized to accept the amount of effluent to be discharged. The bottom wall of the basin is provided with spaced central drain openings 25 and spaced periphery drain openings 26 and 27 adjacent to side walls 22b and 22d as illustrated in FIG. 2. Between the central drains and the periphery drains 26 and 27, the portion 28 of the bottom wall 21 of the basin is sloped upward to a mid-rise point 29 from which it slopes downwardly to the respective drain openings 26 and 27. The central drain openings 25 as well as the drain openings 26 an 27 may be connected by shallow trenches 30, 31 and 32 as illustrated by FIGS. 5, 6 and 7. Other means than sloping bottom walls for the basin may be used to separate the effluent, such as curbing.

Figure 10:
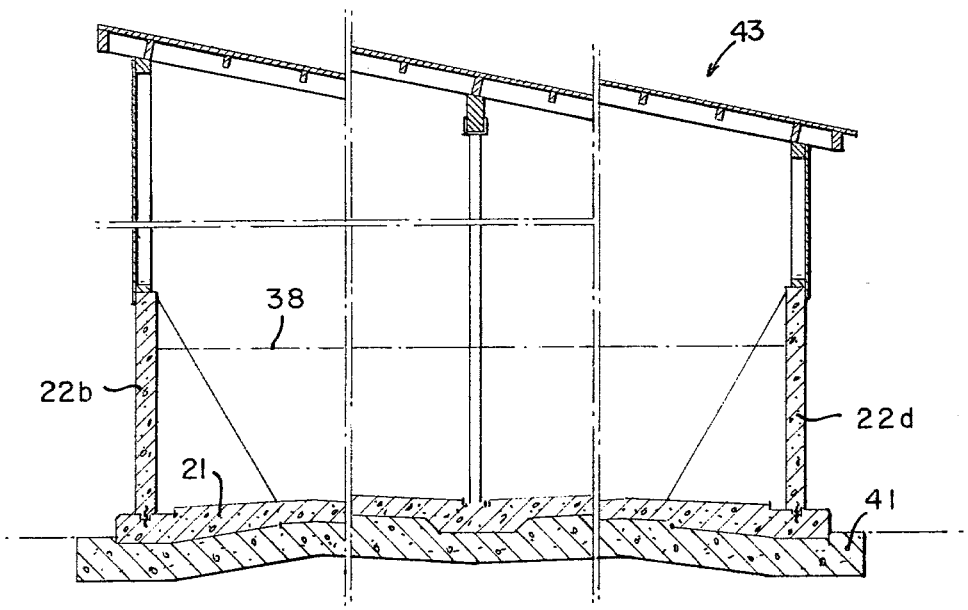
FIG. 10 is an elevation view of an enclosed media basin.

The effluent is delivered into a subsurface area of the media in the media basin by pumping or by gravity through subsurface inlet lines 33 and 34, which enter the media basin through side walls openings 23. The effluent is distributed into the particles of the media bed through perforated pipes 35 and 36, each of which is capped at their respective ends by suitable cap members 37. The distribution lines 35 and 36 are provided with perforations along their entire length, preferably all of the perforations being on one side and positioned to point upwardly. Referring to FIG. 7 the basin is filled with particles of a media 38, such as sand, of the type previously described to a depth of about two thirds the depth of the basin. The area around the distribution lines 35 and 36 is packed with coarse rock 39 or other material such an anthracite coal or activated charcoal. A shallow layer of sand 40 covers the coarse material 39. The basin may be exposed to the open air or enclosed as illustrated in FIG. 10 and is rested on a suitable foundation 41 placed on undisturbed natural ground. As illustrated in FIG. 7 the areas surrounding drains 25, 26 and 27 as well as the slots 30, 31 and 32 are preferably packed with a coarse particulate material 42 such as round rock.

Referring to FIG. 5 the lines 33 and 34 leading from the wet well 11 are provided with suitable valving such as gate valves to control discharge of the effluent to the distribution lines 35 and 36. Check valves may also be provided in lines 33 and 34. If desired, the submersible pumps 12 and 13 which pump effluent from the wet well 11 into lines 33 and 34 may be provided with a clock timer, high and low limit switches and alternating relay, or all of the above, for automatically alternating flow of the effluent between distribution lines 33 and 34. By so doing matting and clogging of the media in the basin is deterred by allowing rest periods for bacterial action to take place. Depending on climatic conditions and other factors it may be desirable to enclose the basin in a structural enclosure 43 (see FIG. 10). An enclosure over the basin may be used to control the ambient air temperature around the basin to ensure optimum operating conditions as well, the enclosure incorporating light filters to prevent plant growth on the surface of the media. Heat lamps irradiating the surface of the media in the basin, heat tapes in the basin, a heater in the recirculation tank for the effluent, or other means may be used to maintain the media in the basin at an optimum temperature for bacterial action.

The effluent exiting through the perforations in distribution lines 35 and 36 is retained by the media until surface tension between the effluent and particles of the media is overcome by additional effluent and the effect of gravity. The effluent displaced collects in the center trench 31 for exit through drain openings 25. Each of the drain openings 25, as illustrated in FIGS. 5 and 7 connects with a common drain line 44 which carries the effluent by gravity to a recirculation tank 50.

The recirculation tank is illustrated in FIG. 5 and is preferably submerged below the level of the basin so that the effluent from the basin flows into the recirculation tank by gravity. Sizing of the recirculation tank depends on the capacity and sizing of the basin. The recirculation tank 50 as illustrated in FIG. 5 includes a bottom wall 51, side walls 52 and a top wall 53. Access to each section of the recirculating tank is through openings in the top wall. A recirculating pump 56 is set in a housing 57 resting above on the top wall 53 as illustrated in FIG. 5. The inlet of the pump is connected to a suction line 58 extending down into the tank. The outlet of the pump is connected to a recirculation line 59 which pumps the effluent through a series of lines 60 connecting with a plurality of nozzles 61. The array of nozzles illustrated in FIG. 5 is exemplary. Other arrays may be used. What is desired is to inject the effluent into the air above the basin for even distribution of the effluent over the entire surface of the media in the basin. The nozzles are sized and adapted to cover the entire surface of the media, effect optimum droplet size and application rate. High water and lower water alarms of a conventional nature, such as floating mercury switches, are preferably provided to activate and shut off the pump as necessary. Primary control of the pump is by a clock timer. About one third of the recirculated effluent, as it is displaced from the media in the basin a second time collects in trenches 30 and 32 and exits through drain openings 26 and 27 connected to drain lines 62 and 63. These drain lines are connected together by line 64 leading to a wet well 65. If desired, a gate valve 66 may be provided to control effluent entering the wet well. The effluent discharged from the basin into the wet well may be discharged directly into a subsurface drainfield, discharged to a land application site or used as process water for landscape irrigation, for toilets, urinals or other such uses. The wet well 65, if at a level below that needed for disposal of the effluent is provided with submersible pumps 67 for pumping of the effluent through lines 68 and 69.

As previously described, sizing of the basin recirculation tank, pumps, nozzles and other components of the system is dependent on the amount of wastewater entering the system. The following is an illustration of the system of FIGS. 5 to 9 but is not intended to be limiting in any manner.

Wastewater, after separation of the settleable solids in a septic tank, exited the septic tank through a 4 inch line 10 into wet well 11 provided with two submersible pumps 12 and 13. The pumps were fitted with a control system providing high water and low water controls as well as means for alternating activation of the pumps and setting off an alarm if either or both of the pumps failed to satisfactorily operate. Effluent from the wet well 11 was initially pumped through line 34 into subsurface distribution lines 36 which were 4 inches in diameter and provided with multiple perforations facing upwardly. The distribution lines were set in a bed of round rock 39 averaging about $\frac{3}{4}''$ to $1\frac{1}{2}''$ particle size. The reinforced concrete basin was 26 feet ×26 feet having side walls approximately 6 feet high filled with medium sand having a particle size as previously described. The top surface of the sand was about 18 inches below the top of the side wall of the basin. The distribution lines 35 and 36 were set in the coarse rock layer 39 about 9 inches below the surface of the sand 40 and about 2 inches below the top surface of the rock 39 surrounding the distribution lines. The layer of rock was about 12 inches in depth. The trenches 30 and 32 in the basin were about 6 inches wide and 2 inches deep while the center trench 31 was 8 inches wide and 2 inches deep. All of the trenches connected with 6 inch drain openings and 6 inch drain lines, the center drain line 44 leading to the recirculation tank 50 and the drain lines 62, 63 and 64 leading to wet well 65. The recirculation tank 50 of reinforced concrete was about 115 inches wide, 72 inches long and 62 inches high, the tank having a capacity of about 1500 gallons. The pump housing atop the recirculating tank was provided with a suction line 58 positioned about 8 inches from the bottom wall of the recirculating tank 50. Two recirculating pumps were utilized, together with a control system including a high water and low water sensing means and an alarm system for indicating failure of one or both of the pumps. Two pumps were used in the event that one pump failed to operate satisfactorily. The outlet of the pump recirculated the effluent back through lines 59 and 60 and nozzles 61 which sprayed the effluent into the air above the media in the basin for even distribution of the effluent over the top surface of the media. The recirculated effluent was retained by the media a sufficient time for the aerobic bacteria in the media to reduce the bacterial count substantially before being displaced by additional effluent applied onto the top surface of the media. Referring to FIG. 7, when the recirculated effluent displaced from the media contacted the sloping bottom wall of the basin, about one third of the effluent flowed to the outer drain openings 26 and 27 and out through drain lines 62 and 63 for disposal. The portion of effluent contacting the sloping wall 28 again exited through the central drains 25 of the basin and was again recirculated. Oxygen dissolved in the recirculated effluent and free oxygen carried with the recirculated effluent into the media promoted bacterial degradation of the suspended solids held by the media and promoted oxidation of the BOD so that the effluent discharged was not only free of suspended solids and other contaminants but had a low bacterial count.

Effluent discharged from an intermittent filter system as illustrated in FIG. 1 can be expected to have a bacterial count of as much as 2,000,000 fecal organisms per 100 ml. The Hines-Favreau system illustrated in FIG. 2 can be expected to discharge an effluent having a bacterial count ranging from about 200,000 to 500,000 fecal organisms per 100 ml. The system described and claimed herein, however, is capable of discharging an effluent containing less than 100 fecal organisms per 100 ml.

For possible control of nitrates in the effluent a vessel containing pieces of anthracite coal may be positioned to receive the untreated an anaerobic effluent discharged from the septic tank. The effluent is preferably introduced into the vessel holding the coal near the lower end with exit of the effluent near the upper end so as to provide a holding time of the untreated effluent within the vessel in contact with the coal. The effluent, after passage through the coal then flows to the media basin for distribution therein.

We claim:
1. A method for treatment of wastewater comprising:
effecting solid-liquid separation of the gravity settleable solids portions of the wastewater to give an anaerobic effluent,
distributing the anaerobic effluent with the solids removed into and beneath the upper surface of a bed comprising particles of media conducive to the growth and maintenance of aerobic soil organisms at a rate sufficient to allow the media to retain the effluent therein for a first retention time before displacement by additional effluent and gravity, collecting the displaced aerobically treated effluent from the media, distributing the collected and displaced effluent evenly over the same bed of media for retention within the media a second retention time sufficient for the aerobic bacteria in the media to substantially reduce the bacterial count of the wastewater before displacement by additional effluent and gravity, the collected and displaced aerobically treated effluent containing dissolved oxygen and carrying free oxygen with it into the media for use by aerobic bacteria contained therein, and collecting and discharging the aerobically treated effluent displaced a second time from the media.

2. The method of claim 1 wherein substantially all of the aerobically treated effluent first displaced from the media is collected and distributed evenly over the top surface of the media by timed-control spraying for retention and displacement therefrom a second time and wherein the aerobically treated effluent displaced a second time is collected for discharge at a different point than the point of collection of the effluent first displaced from the media.

3. The method of claim 1 wherein the effluent with the solids removed is distributed intermittently between a first subsurface area of the media and a second subsurface area of the same media to allow sufficient time for degradation of the organic material in the effluent held by the media by aerobic bacteria in the media surrounding the first and second subsurface areas.

4. The method of claim 3, including selectively collecting the displaced aerobically treated effluent distributed to either the first or second subsurface area of the media and distributing the displaced aerobically treated effluent evenly over the portion of the surface of the media not receiving untreated effluent not receiving untreated effluent.

5. The method of claim 1, wherein the particle size of the media bed is sufficiently small to prevent channeling of effluent therethrough and sufficiently large to discourage hydraulic compaction and adequate drainage, and is such that, when saturated with effluent, retains the effluent within the interstices between the particles until the surface tension between the effluent held in the interstices and the particles is overcome by additional amounts of effluent and gravity.

6. The method of claim 5, wherein the media ia sand having a uniformity coefficient of about 2.5 and a grain size distribution as follows:

|  | Percentages |
| --- | --- |
| Passing a ⅜" sieve | 100 |
| Passing a No. 4 sieve | 80–100 |
| Passing a No. 10 sieve | 35–80 |
| Passing a No. 30 sieve | 10–60 |
| Passing a No. 50 sieve | 0–30 |
| Passing a No. 100 sieve | 0–5 |

7. The method of claim 1, including controlling the amount of anaerobic and aerobically treated effluent distributed to the media to allow retention of the effluent within the media a time sufficient for bacterial action and biodegradation of the suspended solids in the effluent to take place.

8. An on-site wastewater treatment system for treatment of wastewater containing biodegradable solids comprising:

separation means for effecting separation of the gravity settleable solids portion of the wastewater from the untreated liquid effluent, a media basin containing particles of a media conducive to the growth and maintenance of aerobic soil organisms for the biological treatment of wastewater, distribution means receiving the untreated liquid effluent from the separation means, the distribution means positioned within the particles of the media in the basin for distribution of the untreated effluent, outlet means in the media basin for collecting aerobically treated effluent displaced from the media after a first retention time by the action of gravity and additional quantities of effluent distributed to the media, recirculation means receiving the collected and displaced aerobically treated effluent and injecting it into the air above the media in the basin for distribution over the surface of the media for retention and travel therethrough a second time, the recirculated effluent displacing retained effluent within the media, and outlet means for discharge of the recirculated effluent contained therein.

9. An on-site wastewater treatment system for treatment of wastewater containing biodegradable solids comprising:

separation means for effecting separation of the gravity settleable solids portion of the wastewater from the untreated liquid effluent, a media basin containing particles of a media conducive to the growth and maintenance of aerobic soil organisms for the biological treatment of wastewater, distribution means receiving the untreated liquid effluent from the separation means, the distribution means positioned within the particles of the media in the basin for distribution of untreated effluent through the media, first outlet means in the media basin for collecting aerobically treated effluent displaced from the media by additional quantities of effluent and gravity after a first retention time of the effluent within the media, recirculation means receiving the displaced aerobically treated effluent and injecting it into the air above the media in the basin for even distribution over the surface of the media and retention thereby a second time and and for displacement of the retained effluent within the media a second time, and second outlet means in the media basin receiving a portion of the displaced recirculated effluent.

10. The system of claims 8 or 9, including means for controlling amounts of untreated effluent and aerobically treated effluent delivered to the media bed to allow retention of the effluent within the bed a sufficient time for bacterial action and biodegradation of the suspended solids to take place.

11. The system of claims 8 or 9, wherein the media is sand having a uniformity coefficient of about 2.5 and a grain size distribution as follows:

|  | Percentages |
| --- | --- |
| Passing a ⅜" sieve | 100 |
| Passing a No. 4 sieve | 80–100 |
| Passing a No. 10 sieve | 35–80 |
| Passing a No. 30 sieve | 10–60 |
| Passing a No. 50 sieve | 0–30 |
| Passing a No. 100 sieve | 0–5 |

12. The system of claim 9 wherein the distribution means includes a first distribution system for distributing untreated effluent to a first discrete subsurface area of the media and a second distribution system for distributing untreated effluent to a second discrete subsurface area of the media, and means for intermittently controlling delivery of the untreated effluent between the first and second distribution systems.

13. The system of claim 12 wherein the first and second distribution systems are positioned within the media basin so that substantially all of the untreated effluent passing into the first and second distribution systems, after the first retention time within the media, is discharged through the first outlet means of the media basin.

14. The system of claim 12 wherein the media basin is provided with means for separating the displaced aerobically treated effluent so that the effluent flowing therethrough for the first time is discharged through the first outlet means and a portion of the effluent flowing therethrough for the second time is discharged through the second outlet means.

15. The system of claim 12, including timed control means operatively connected to the first and second subsurface distribution systems for switching untreated effluent flow between the first subsurface distribution system and the second subsurface distribution system.

16. The system of claim 12 wherein the media basin is separated into two separate portions with the first distribution system distributing untreated effluent within one of the separated portions and the second distribution system distributing untreated effluent into the other separated portion, and wherein the recirculation means includes means for distributing the recirculated effluent over the surface of the media in the basin not receiving the untreated effluent through its subsurface distribution system.

17. The system of claim 9 wherein the recirculation means includes (1) a recirculation vessel receiving the displaced aerobically treated effluent flowing through the first outlet means of the media basin, (2) a pump for pumping the aerobically treated effluent from the recirculation vessel, and (3) one or more nozzles connected to the pump for injecting the aerobically treated effluent into the air above the media for even distribution thereof onto the surface of the media for retention and displacement thereby a second time, the recirculated aerobically treated effluent displacing retained aerobically treated effluent within the media through the second outlet means of the basin for discharge.

18. The system of claim 9 wherein the separation means is a septic tank having an inlet receiving the untreated wastewater containing solids therein and an outlet connected to the subsurface distribution means within the media basin, the septic tank effecting solid-liquid separation and delivering an anaerobic untreated effluent to the subsurface distribution means within the media basin.

19. The system of claim 9 including a vessel having an inlet and outlet and holding pieces of anthracite coal, the vessel receiving untreated effluent through the inlet from the separation means and discharging effluent through the outlet to the distribution means.

20. An on-site wastewater treatment system providing an effluent containing minimal suspended solids and low bacterial count, comprising:

a septic tank having an inlet receiving untreated wastewater containing solids therein and an outlet connected to a subsurface effluent distribution means, the septic tank effecting solid-liquid separation and delivering an aerobic untreated effluent to the subsurface distribution means, a basin containing particles of a media conducive to the growth and maintenance of aerobic soil organisms for the biological treatment of wastewater, subsurface effluent distribution means positioned within the particles of the media in the basin which receive the untreated effluent from the septic tank and distribute it through the media for retention thereby for aerobic bacterial action and biodegradation of the suspended solids until displaced by additional effluent and gravity, the subsurface distribution means including a first subsurface distribution system for distribution of the untreated effluent within a first discrete area of the media and a second distribution system for distribution of the untreated effluent within a separate second discrete area of the media, means for controlling delivery of the untreated effluent intermittently between the first and second subsurface distribution systems, first outlet means in the bottom wall of the basin beneath the subsurface distribution means for collecting aerobically treated effluent displaced from the media, a recirculation tank receiving the displaced aerobically treated effluent discharged from the first outlet means in the basin, means for timed-controlled pumping of the displaced aerobically treated effluent from the recirculation tank and injecting it into the air above the media in the basin for even distribution across the surface of the media for retention by the media a second time, the recirculated aerobically treated effluent displacing retained effluent held within the media, second outlet means in the basin receiving a portion of the aerobically treated effluent retained and displaced a second time from the media, and means connecting with the second outlet from the basin receiving the aerobically treated effluent for discharge.

21. The system of claim 20, including timed control means operatively connected to the first and second subsurface distribution systems for switching the untreated effluent flow between the first subsurface distribution system and the second subsurface distribution system.

* * * * *